United States Patent
Okamura et al.

[11] Patent Number: 6,130,277
[45] Date of Patent: Oct. 10, 2000

[54] RUBBER COMPOSITION IMPROVED IN ANTI-STATIC PROPERTY AND PNEUMATIC TIRE USING THE SAME

[75] Inventors: Nobuyuki Okamura, Kodaira; Masaaki Tsuchihashi; Isao Nishi, both of Wakayama, all of Japan

[73] Assignee: Bridgestone Corporation, Tokyo, Japan

[21] Appl. No.: 09/046,589

[22] Filed: Mar. 24, 1998

[30] Foreign Application Priority Data

Mar. 31, 1997 [JP] Japan ................................ 9-81080
Mar. 31, 1997 [JP] Japan ................................ 9-81083
May 9, 1997 [JP] Japan ................................ 9-129837

[51] Int. Cl.$^7$ .................................................. C08K 5/09
[52] U.S. Cl. .................... 524/306; 524/308; 524/379; 524/317
[58] Field of Search ................ 524/379, 308, 524/317, 155, 156, 306

[56] References Cited

U.S. PATENT DOCUMENTS 4,364,970 12/1982 Imada et al. ................ 427/40
5,039,725 8/1991 Nakamura et al. ............ 524/269
5,788,786 8/1998 Yamauchi et al. ............ 152/209 R
5,845,869 12/1998 Makino ........................ 242/584.1

*Primary Examiner*—James J. Seidleck
*Assistant Examiner*—U. K. Rajguru
*Attorney, Agent, or Firm*—Sughrue, Mion, Zinn, Macpeak & Seas, PLLC

[57] ABSTRACT

Provided are a rubber composition improved in an anti-static property and a pneumatic tire using the same for its tread part, wherein the rubber composition comprises natural rubber and/or diene base synthetic rubber and a white filler as a filler, and further comprises an anionic anti-static agent or a polyoxyalkylene glycol compound represented by the flowing formulas (I), (II) or (III):

$$R^1C(\!=\!\!=\!\!O)O(R^2O)_nC(\!=\!\!=\!\!O(R^3 \quad (I)$$

$$R^4CH_2O(R^2O)_nC(\!=\!\!=\!\!O)R^3 \quad (II)$$

$$R^4CH_2O(R^2O)_nCH_2R^5 \quad (III)$$

wherein $R^1$ and $R^3$ each represent a linear or branched, saturated or unsaturated aliphatic hydrocarbon group having 1 to 21 carbon atoms, or an aryl group; $R^4$ and $R^5$ each represent a hydrogen atom, a linear or branched, saturated or unsaturated aliphatic hydrocarbon group having 1 to 21 carbon atoms, or an aryl group; $R^1$ and $R^3$ in the above formula (I), $R^4$ and $R^3$ in the above formula (II) and $R^4$ and $R^5$ in the above formula (III) in one same molecule may be the same as or different from each other; $R^2$ is a methylene, ethylene, propylene or tetramethylene group, and all $R^2$'s may be the same or different; and n is an integer of 100 or less.

9 Claims, 2 Drawing Sheets

RUBBER COMPOSITION IMPROVED IN ANTI-STATIC PROPERTY AND PNEUMATIC TIRE USING THE SAME

BACKGROUND OF THE INVENTION

1. Field of the Invention

The present invention relates to a rubber composition improved in an anti-static property and a pneumatic tire using the rubber composition.

2. Description of the Related Art

Natural rubber and synthetic rubber are used in various industrial fields including tires. In general, these rubbers are insulating materials and substantially have a property to be liable to carry static charge.

It has so far been carried out as a publicly known technique to reduce a volume resistance of rubber and improve the anti-static property by blending a rubber composition with carbon black. However, this technique is restricted to black color products.

It is known that carbon black blended into a rubber composition increases hysteresis loss even in black color products such as a tire. In recent years, it is investigated to decrease the blending amount thereof or to substitute a white filler such as silica for carbon black in low fuel consumption tires. In this case, conductivity provided by carbon black is reduced, which in turn causes a result that static charge is liable to be carried.

If tires carry static charge, concerned are the inconveniences, for example, that when passengers get off a car they have an unpleasant feeling because of an electric shock, and that radio waves are generated when static charge accumulated in tires is discharged, so as to cause radio noises.

A technique of blending nonionic surfactants or phosphoric acid esters is known as a conventional anti-static technique for a rubber composition for tires, as disclosed in International Patent Application Laid-open No. WO 95/31888 applied by one of the present inventors. This technique is excellent in terms of being capable of reducing a volume resistance of a rubber composition but has a problem that an anti-static effect is reduced in a relatively short period of time depending on conditions of using the tires.

On the other hand, anionic anti-static agents are already publicly known as anti-static agents for plastics, but it is not known that they provide rubber compositions capable of maintaining an anti-static performance over a long period of time in combination of rubber including diene base rubber with a specific filler.

Although it is known that polyoxyalkylene glycol esters are excellent as a low temperature resistant and heat resistant plasticizer for butadiene rubber as described in Japanese Patent Publication No. Hei 6-4722 applied by one of the present inventors, it is not yet known that they have an anti-static performance.

SUMMARY OF THE INVENTION

An object of the present invention is to provide a rubber composition capable of maintaining an anti-static performance over a long period of time and a pneumatic tire provided with an excellent anti-static performance by using the rubber composition.

Intensive investigations continued by the present inventors in order to solve the problems described above have resulted in finding that a rubber composition capable of maintaining an anti-static performance over an long period of time can be obtained by adding a specific filler and a specific additive for rubber to natural rubber and/or diene base synthetic rubber and thus coming to complete the present invention. That is, the present invention comprises the following constituents (1) to (7):

(1) A rubber composition improved in an anti-static property comprising natural rubber and/or diene base synthetic rubber and a white filler as a filler, and further comprising an anionic anti-static agent or a polyoxyalkylene glycol compound represented by the following formula (I), (II) or (III):

wherein $R^1$ and $R^3$ each represent a linear or branched, saturated or unsaturated aliphatic hydrocarbon group having 1 to 21 carbon atoms, or an aryl group; $R^4$ and $R^5$ each represent a hydrogen atom, a linear or branched, saturated or unsaturated aliphatic hydrocarbon group having 1 to 21 carbon atoms, or an aryl group; $R^1$ and $R^3$ in the above formula (I), $R^4$ and $R^3$ in the above formula (II) and $R^4$ and $R^5$ in the above formula (III) in one same molecule may be the same as or different from each other; $R^2$ is a methylene, ethylene, propylene or tetramethylene group, and all $R^2$'s may be the same or different; and n is an integer of 100 or less.

(2) The rubber composition improved in an anti-static property as described in the above (1), wherein the polyoxyalkylene glycol compound represented by the formula (I), (II) or (III) described above has a molecular weight of 300 to 2600.

(3) The rubber composition improved in an anti-static property as described in the above (1) or (2), wherein the polyoxyalkylene glycol compound represented by the formula (I), (II) or (III) described above has an amount of etheric oxygen of 12 to 30% by weight in one molecule.

(4) The rubber composition improved in an anti-static property as described in any of the above (1) to (3), wherein $R^2$ in the polyoxyalkylene glycol compound represented by the formula (I), (II) or (III) described above is an ethylene group and in the case of the formula (I), $R^1$ is an alkyl group having 1 to 17 carbon atoms, and $R^3$ is an alkyl group having 7 to 17 carbon atoms; in the case of the formula (II), $R^4$ is a hydrogen atom or an alkyl group having 1 to 17 carbon atoms, and $R^3$ is an alkyl group having 7 to 17 carbon atoms; and in the case of the formula (III), $R^4$ is a hydrogen atom or an alkyl group having 1 to 17 carbon atoms, and $R^5$ is a hydrogen atom or an alkyl group having 7 to 17 carbon atoms.

(5) The rubber composition improved in an anti-static property as described in the above (1), wherein the anionic anti-static agent contains a sulfonic acid group.

(6) The rubber composition improved in an anti-static property as described in the above (1) or (5), wherein the anionic anti-static agent is dialkyl sodium sulfosuccinate.

(7) A pneumatic tire characterized by using the rubber composition improved in an anti-static property as described in any of the above (1) to (6) for a tread part.

According to the present invention, there is provided a rubber composition improved in an anti-static property, in which the low heat-generating property, anti-static performance and durability thereof are simultaneously satisfied.

Further, according to another aspect of the present invention, there is provided a pneumatic tire having an excellent low fuel consumption and capable of preventing troubles likely to occur with static charge.

DETAILED DESCRIPTION OF THE PREFERRED EMBODIMENTS

Figure 1:
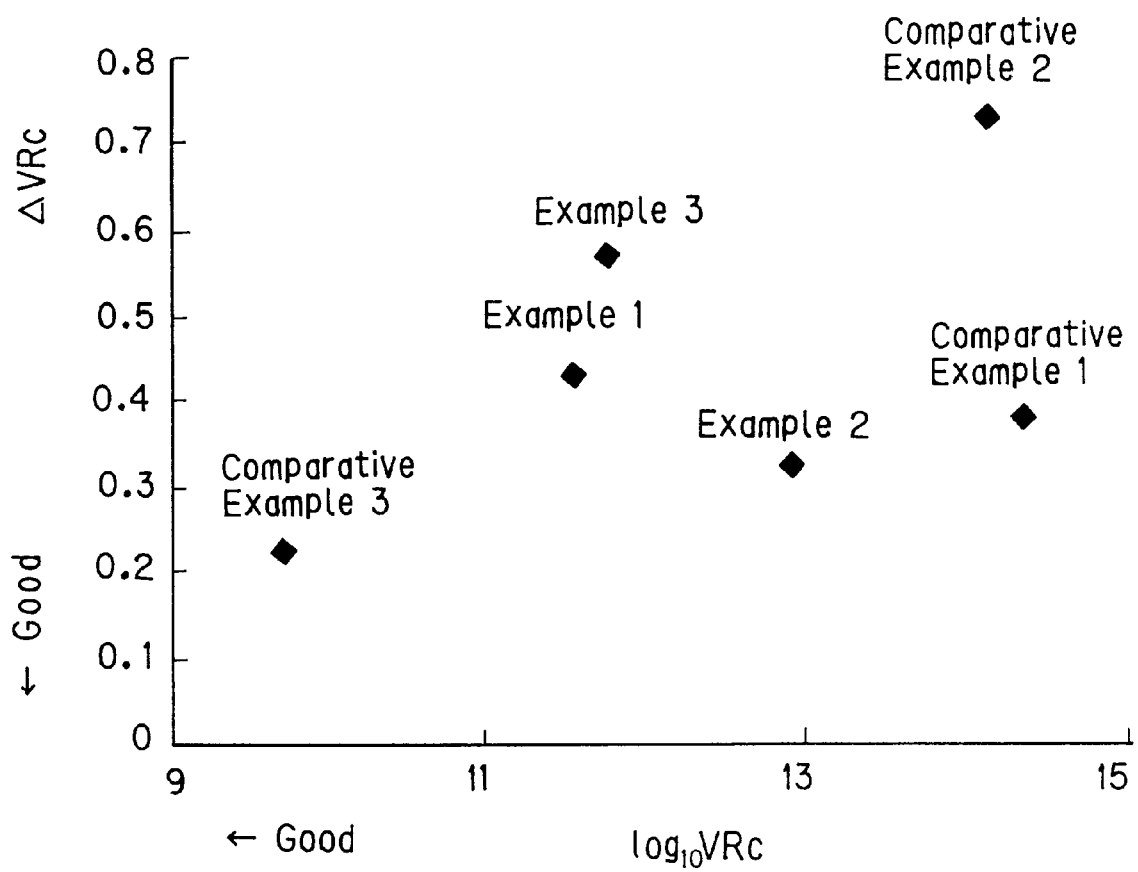
FIG. 1 is a characteristic drawing showing the relation of a volume resistance (common logarithmic value) with the durability [change (ΔVRc) in the volume resistance] of an anti-static performance in Examples 1 to 3 and Comparative Examples 1 to 3.

The embodiments of the present invention shall be explained below in detail.

The rubber composition improved in an anti-static property of the present invention (hereinafter referred to merely as the rubber composition of the present invention) comprises natural rubber and/or diene base synthetic rubber and a white filler as a filler, and further comprises an anionic anti-static agent or a polyoxyalkylene glycol compound represented by the formula (I), (II) or (III) described previously as an anti-static agent.

Natural rubber (NR) and/or diene base synthetic rubber can be used as rubber used for the rubber composition of the present invention. The diene base synthetic rubber includes, for example, styrene butadiene rubber (SBR), butadiene rubber (BR), isoprene rubber (IR), butyl rubber (IIR), halogenated butyl rubber (X-IIR), ethylene propylene rubber (EPDM) and a mixture thereof.

The white filler used for the rubber composition of the present invention includes, for example, silica, aluminum hydroxide (Hygilite), magnesium hydroxide, magnesium oxide, titanium oxide, talc and clay. They can be used singly or in a mixture of two or more kinds thereof.

Silica and aluminum hydroxide are particularly preferred as white fillers.

When these white fillers are used for a rubber composition for a tire tread, an improvement of wet performance of the tire is made to be compatible with the low fuel consumption performance.

The blending amount of the white filler shall not specifically be restricted and is suitably set up according to uses of a rubber composition.

For example, when the white fillers described above are used for a rubber composition for a tire tread, the blending amount of the white filler is 10 to 60 parts by weight, particularly preferably 30 to 50 parts by weight per 100 parts by weight of said rubber component comprising natural rubber (NR) and/or diene base synthetic rubber from the viewpoint of improvement in a wet performance.

When the white fillers are used, it is preferable, in general, to add an additive called a coupling agent in order to increase an affinity between the filler and rubber molecules or in order to chemically combine them to raise the abrasion resistance.

A silane coupling agent is suitably used as a coupling agent. To be specific, it includes, for example, bis(3-triethoxysilylpropyl)tetrasulfide, bis(3-triethoxysilylpropyl) trisulfide, bis(3-triethoxysilylpropyl)-disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, 3-nitropropyldimethoxymethylsilane, 3-chloropropyldimethoxymethylsilane, dimethoxymethylsilylpropyl-N,N-dimethylthiocarbamoyl tetrasulfide, and dimethoxymethylsilylpropylbenzothiazole tetrasulfide.

The blending amount of the silane coupling agent is variable depending on the blending amount of the white filler and is 1 to 15% by weight, preferably 1 to 12% by weight based on the weight of the white filler. If the blending amount of the silane coupling agent is less than 1% by weight based on the weight of the white filler, an effect of adding the silane coupling agent is not satisfactory, and if the blending amount exceeds 15% by weight, the reinforcing property and the abrasion resistance result in being reduced.

Carbon black can be used in combination as a filler in addition to the white fillers described above.

The blending amount of carbon black shall not specifically be restricted as well and is preferably 0 to 50 parts by weight, more preferably 0 to 40 parts by weight per 100 parts by weight of the rubber component described previously.

If an amount exceeding 50 parts by weight of carbon black is blended, the conductivity originating from carbon black increases, and the anti-static property contributed by the anionic anti-static agent or the polyoxyalkylene glycol compound becomes relatively less significant. On the other hand, the hysteresis loss originating from carbon black becomes too large.

The anti-static agent used in the present invention is blended in order to provide the rubber composition with an anti-static performance over a long period of time.

The anionic anti-static agent is preferably a compound containing a sulfonic acid group. To be specific, it includes dialkyl sodium sulfosuccinate, sodium polyoxyethylene alkylethersulfate, sodium alkylsulfonate and sodium alkylbenzenesulfonate. Among them, dialkyl sodium sulfosuccinate is preferred since it has a high anti-static property.

Next, the polyoxyalkylene glycol compound used in the present invention is a polyoxyalkylene glycol compound represented by the following formula (I), (II) or (III):

$$R^1C(\!\!=\!\!O)O(R^2O)_nC(\!\!=\!\!O)R^3 \quad \text{(I)}$$

$$R^4CH_2O(R^2O)_nC(\!\!=\!\!O)R^3 \quad \text{(II)}$$

$$R^4CH_2O(R^2O)_nCH_2R^5 \quad \text{(III)}$$

wherein $R^1$ and $R^3$ each represent a linear or branched, saturated or unsaturated aliphatic hydrocarbon group having 1 to 21 carbon atoms, or an aryl group which has preferably 6 to 21 carbon atoms; $R^4$ and $R^5$ each represent a hydrogen atom, a linear or branched, saturated or unsaturated aliphatic hydrocarbon group having 1 to 21 carbon atoms, or an aryl group which has preferably 6 to 21 carbon atoms; $R^1$ and $R^3$ in the above formula (I), $R^4$ and $R^3$ in the above formula (II) and $R^4$ and $R^5$ in the above formula (III) in one same molecule may be the same as or different from each other; $R^2$ is a methylene, ethylene, propylene or tetramethylene group, and all $R^2$'s may be the same or different; and n is an integer of 100 or less.

Preferably, $R^2$ in the polyoxyalkylene glycol compound represented by the formula (I), (II) or (III) described above is an ethylene group and in the case of the formula (I), $R^1$ is preferably an alkyl group having 1 to 17 carbon atoms, and $R^3$ preferably is an alkyl group having 7 to 17 carbon atoms; in the case of the formula (II), $R^4$ is preferably a hydrogen atom or an alkyl group having 1 to 17 carbon atoms, and $R^3$ is preferably an alkyl group having 7 to 17 carbon atoms; and in the case of the formula (III), $R^4$ is preferably a hydrogen atom or an alkyl group having 1 to 17 carbon atoms, and $R^5$ is preferably a hydrogen atom or an alkyl group having 7 to 17 carbon atoms.

The blending amount of the anti-static agent used in the present invention shall not specifically be restricted and is preferably 0.5 to 10 parts by weight, more preferably 2 to 8 parts by weight per 100 parts by weight of the rubber component described previously.

If the blending amount of the anti-static agent is less than 0.5 part by weight, the anti-static effect is not satisfactory, and if it exceeds 10 parts by weight, the anti-static effect does not increase to such an extent as expected therefrom, which results in increasing the cost of the rubber composition.

A mechanism in which the rubber composition is provided with an anti-static effect by the anti-static agent of the present invention has not yet been made clear. As shown in the examples described later, however, the polyoxyalkylene glycol compound has an effect of reducing a volume resistance of the rubber composition. Accordingly, it is presumed that the anionic anti-static agent and the polyoxyalkylene glycol compound form some conductive route in the rubber composition.

It is said that in a revealing mechanism of an anti-static effect in a conventional kneading type anti-static agent for plastics, the anti-static agent bleeds out on the surface and is combined with water in the air to form a conductive layer on the surface (reduce the surface resistance). In this mechanism, however, it is considered to be difficult to apply such anti-static agent to uses in which a surface always contacts a road and is abraded as is the case with a tire. In that sense, it is considered that the anti-static agent of the present invention which is presumed to reduce a volume resistance of the rubber composition so as to raise a conductivity of the rubber composition itself exerts a particularly excellent effect in its application to a tire.

The polyoxyalkylene glycol compound used for the rubber composition of the present invention is characterized by having no alcoholic OH groups. That is, a technique of employing a conventional nonionic type surfactant having alcoholic OH groups for anti-static use is disclosed in, for example, WO95/31888, but the polyoxyalkylene glycol compound used in the present invention can improve the durability of an anti-static effect by having no alcoholic OH groups as explained in detail by examples described later.

The polyoxyalkylene glycol compound represented by Formula (I) dan be obtained, for example, by esterifying polyoxyalkylene glycol with carboxylic acids corresponding to $R^1$ and $R^3$ in Formula (I) at high temperatures.

Polyoxyalkylene glycol may be either a polymer of a single monomer like polyethylene glycol or a copolymer of plural monomers like ethylene oxide and propylene oxide, and polyethylene glycol is the most preferable in terms of volume-resistance-reducing effect.

Fatty acids such as butyric acid and caprylic acid, aromatic carboxylic acids such as benzoic acid, or mixed fatty acids obtained from animal oils and vegetable oils can be used as the carboxylic acids corresponding to $R^1$ and $R^3$ in Formula (I), and saturated or unsaturated fatty acids in which $R^1$ and $R^3$ each are alkyl groups having 7 to 17 carbon atoms is the most preferable from the viewpoint of volume-resistance-reducing effect. Saturated fatty acids in which $R^1$ and $R^3$ each are alkyl groups having 7 to 17 carbon atoms include, for example, caprylic acid, capric acid, lauric acid, myristic acid, pentadecylic acid, palmitic acid and stearic acid.

The polyoxyalkylene glycol compound represented by Formula (II) can be obtained, for example, by esterifying polyoxyalkyl ether with carboxylic acid corresponding to $R^3$ in Formula (II) at high temperatures, wherein $R^4$ is preferably a hydrogen atom or an alkyl group having 1 to 17 carbon atoms, and $R^3$ is preferably an alkyl group having 7 to 17 carbon atoms.

The polyoxyalkylene glycol compound represented by Formula (III) can be obtained, for example, by reacting polyoxyalkylene glycol, KOH or NaOH equivalent thereto with alkyl halide corresponding to $R^4$ and $R^5$ in Formula (III), wherein polyoxyalkylene glycol may be either a polymer of a single monomer like polyethylene glycol or a copolymer of plural monomers like ethylene oxide and propylene oxide, and polyethylene glycol is the most preferable in terms of volume-resistance-reducing effect.

This polyoxyalkylene glycol compound has preferably a molecular weight of 300 to 2600. If the molecular weight is less than 300, the durability of the volume-resistance-reducing effect is reduced since the polyoxyalkylene glycol compound is liable to volatilize, and if the molecular weight exceeds 2600, there is a tendency of reducing the volume-resistance-reducing effect.

Further, this polyoxyalkylene glycol compound has preferably an amount of 12 to 30% by weight of etheric oxygen in one molecule. The amount of etheric oxygen in the present invention does not include oxygen in an ester bond.

If the amount of etheric oxygen in one molecule is less than 12% by weight, the volume-resistance-reducing effect is not satisfactory. On the other hand, if the amount of etheric oxygen exceeds 30% by weight, the solubility of polyoxyalkylene glycol compound into rubber is deteriorated, and said compound bleeds out in an early stage. Accordingly, the durability of the volume-resistance-reducing efect is reduced.

The polyoxyalkylene glycol compound used for the rubber composition of the present invention may be a single compound or a mixture as long as it is represented by Formula (I), (II) or (III) described previously. In the case of the mixture, however, the respective polyoxyalkylene glycol compounds constituting the mixture fall desirably in the preferable range of the molecular weight and the amount of etheric oxygen described above.

Further, the anionic anti-static agent and the polyoxyalkylene glycol compound used for the rubber composition of the present invention are liquid or soft semi-solid in some cases. In those cases, they can be adsorbed in advance on silica serving as a white filler so as to improve handling.

In explaining the rubber composition of the present invention described above, emphasis has been put mainly on a rubber composition for a tire tread, but the rubber composition of the present invention not only is used as a rubber composition for a tire tread, but also can be applied to various rubber products other than a tire such as conveyor belts and home electric appliances as long as they are desired to inhibit from generating static charge.

The rubber composition of the present invention can be prepared by kneading the rubber component described above, fillers including the white filler and the anti-static agent by means of, for example, a banbury mixer. Further, compounding agents usually used in the rubber industry, for example, a vulcanizing agent, a vulcanization accelerating agent, a softening agent, an anti-oxidant and a processing aid can suitably be added.

The pneumatic tire of the present invention uses the rubber composition of the present invention having the excellent anti-static effect described above for a tire tread part and inhibits static charge from generating while a car is being driven, whereby inconveniences such as an unpleasant feeling caused by an electric shock when a passenger get off the car and an occurence of a radio noise can be controlled.

EXAMPLES

The present invention shall be explained below in further detail with reference to examples and comparative examples, but the present invention shall not be restricted thereto.

In the examples and the comparative examples, a heat-generating property (index), a volume resistance (VRc), the durability [change ($\Delta$VRc) in the volume resistance] of an anti-static performance and a bloom on a rubber surface were determined for a rubber sheet obtained for evaluating the anti-static agents by the following evaluation methods.

Evaluation of heat-generating property (index value):

A visco-elasticity of a rubber sheet was measured at 50° C., 50 Hz and a distortion of 1% by means of Rheolograph Solid manufactured by Toyo Seiki Mfg. Co., Ltd.

It is generally known that the heat-generating property of rubber is shown by tan $\delta$. A value obtained by dividing tan $\delta$ of each rubber sheet by tan $\delta$ of a rubber sheet of Comparative Example 1 or 4 was represented in percentage to obtain a heat-generating index. The smaller the value is, the better the heat-generating value is.

Evaluation of volume resistance:

Measured at a measuring voltage of 500 V by means of an insulation sample chamber and a high-insulation resistance tester both of which are manufactured by Advantest Co., Ltd.

The value shows a volume resistance, and it means that the smaller the value is the better the conductivity is and thus no static charge is carried. The unit is $\Omega$ cm, and $\Delta.\Delta$E+n represents $\Delta.\Delta \mathrm{X} 10^{+n}$.

Evaluation of durability of anti-static performance:

In order to evaluate the durability of the anti-static performance, each rubber sheet was put in a gear oven at 80° C. for 2 weeks to be aged. After returned to room temperature, the volume resistance was determined.

The volume resistance before aging was designated as $VRc_1$, and the volume resistance after aging was designated as $VRc_2$ to calculate a change ($\Delta$VRa) in the volume resistance according to the following equation:

$$\Delta VRc = \log_{10}(VRc_2/VRc_1)$$

The value means that the smaller the value is, the smaller the change in the volume resistance is and the better the anti-static performance is and that the conductivity can be maintained over a long period of time.

Evaluation of bloom on rubber surface:

A rubber sheet after vulcanization was taken out of a vulcanizing mold and then left standing at room temperature for one day to evaluate the condition of the surface by eyes according to the following three stage evaluation criteria:

○: no bloom

Δ: a little bloom observed

X: considerable amount of bloom observed

Examples 1 to 3 and Comparative Examples 1 to 3

The anionic anti-static agents used for evaluation are shown in the following Table 1. All these anionic anti-static agents used here were manufactured by Nippon Oil & Fat Corp. and added so that the effective ingredients were 50 parts by weight per 100 parts by weight of the rubber component.

These anionic anti-static agents were blended in the components shown in the following Tables 2 and 3 by means of a banbury mixer to prepare rubber compositions.

These rubber compositions were vulcanized at 150° C. for 30 minutes to obtain rubber sheets having a thickness of about 2 mm.

The rubber sheets thus obtained were evaluated for a heat-generating property, a volume resistance and the durability [change ($\Delta$VRc) in the volume resistance] of an anti-static performance.

These results are shown in the following Table 3. The relation of the volume resistance (common logarithmic value) with the durability [change ($\Delta$VRc) in the volume resistance] of the anti-static performance in Examples 1 to 2 and Comparative Examples 1 to 3 is shown in FIG. 1.

TABLE 1

| No. | Brand name | Type | Effective ingredient (amount of effective ingredient %) |
|---|---|---|---|
| A | Rabisol B90 | Anion | Dioctyl sodium sulfosuccinate (90%) |
| B | Persoft EK | Anion | Sodium polyoxyethylene alkyl ether sulfate (30%) |
| C | New Lex Soft 60 | Anion | Sodium dodecylbenzenesulfonate (60%) |
| D | Cation DT | Cation | Alkylbenzylpropylenediammonium dichloride (50%) |

TABLE 2

| Component | Name of product used for component | Parts by weight |
| --- | --- | --- |
| SBR | SBR 1502 manufactured by Japan Synthetic Rubber Co., Ltd. | 100.0 |
| Filler | Nipsil AQ manufactured by Nippon Silica Co., Ltd. or Asahi #70*1 manufactured by Asahi Carbon Co., Ltd. | 50.0 |
| Coupling agent | Si69*2 manufactured by Degussa Japan Co., Ltd.; no addition when the filler is carbon black | 5.0 |
| Anti-static agent | Described in Table 1 | 5.0*3 |
| Stearic acid | Lunac S-40 manufactured by Kao Corp. | 2.0 |
| Zinc oxide | Zinc oxide No. 1 manufactured by Mitsui Kinzoku Kogyo Co., Ltd. | 3.0 |
| Anti-oxidant IPPD*4 | Nocrac 810 NA manufactured by Ohuchi Shinko Chemical Ind. Co. Ltd | 1.0 |
| Vulcanization accelerating agent TBBS*5 | Nocceller NS-P manufactured by Ohuchi Shinko Chemical Ind. Co. Ltd. | 0.5 |
| Vulcanization accelerating agent MBTS*6 | Nocceller DM-P manufactured by Ohuchi Shinko Chemical Ind. Co. Ltd. | 0.5 |
| Sulfur | Powder sulfur manufactured by Karuizawa Seirensho Co., Ltd. | 1.5 |

*1: HAF carbon back
*2: Bis(3-triethoxysilylpropyl)tetrasulfide
*3: Amount of effective ingredient
*4: N-isopropyl-N'-phenyl-p-phenylenediamine
*5: N-tert-butyl-2-benzothiazolyl sulfenamide
*6: 2,2'-Dithio-bisbenzothiazolyl

TABLE 3

| | | Comparative Example | | | Example | | |
| --- | --- | --- | --- | --- | --- | --- | --- |
| | | 1 | 2 | 3 | 1 | 2 | 3 |
| Component | Filler | Silica | Silica | Carbon black | Silica | Silica | Silica |
| | Coupling agent | Present | Present | None | Present | Present | Present |
| | Anti-static agent | None | D | None | A | B | C |
| Evaluation | Heat-generating index (the smaller the better) | 100 | 93 | 164 | 112 | 98 | 95 |
| | Volume resistance (VRc) (the smaller the better) | 2.3E+14 | 1.3E+14 | 5.2E+09 | 3.5E+11 | 8.2E+12 | 5.2E+11 |
| | ΔVRc (the smaller the better) | 0.38 | 0.73 | 0.22 | 0.43 | 0.32 | 0.58 |

Comments on Tables 1 to 3 and FIG. 1:

As apparent from Table 3 and FIG. 1, it has been confirmed that in Examples 1 to 3 falling in the scope of the present invention, both the heat-generating properties and the volume resistances are low as compared with those in Comparative Examples 1 to 3 falling outside the scope of the present invention, so that the anti-static performances are excellent and that the durability of the anti-static performance is improved as well.

Observing the individual cases, it has been confirmed that in the case of Comparative Example 1 in which the anionic anti-static agent is not contained as an anti-static agent, the volume resistance is large and static charge is liable to be generated.

It has been found that in the case of Comparative Example 2 in which the cationic anti-static agent (alkylbenzylpropylenediammonium dichloride) is blended as an anti-static agent, the effect of reducing the volume resistance is small.

It has been confirmed that in the case of Comparative Example 3 in which carbon black is used as a filler, the volume resistance is low and the durability of the anti-static performance is excellent without adding the anti-static agent but the heat-generating property is inferior to a large extent.

In the case of Examples 1 to 3 in which the anionic anti-static agents of the present invention are contained, the low heat-generating properties, the anti-static performances and the durabilities thereof all are simultaneously satisfied.

Examples 4 to 12 and Comparative Examples 4 to 6

The polyoxyalkylene glycol base anti-static agents used in Examples 4 to 12 and Comparative Examples 4 to 6 are shown in the following Table 4. They were synthesized by the following respective methods (1) to (10).

(1) Synthesis of $CH_3(CH_2)_6COO(CH_2CH_2O)_9H$

Polyethylene glycol #400 (molecular weight: 400) of 400 g (1.0 mole), caprylic acid of 72 g (0.5 mole) and dibutyltin oxide of 0.14 g as a catalyst were weighed into a four neck flask of 500 ml, and esterification reaction was carried out at 225° C. for 5 hours while stirring under blowing nitrogen gas.

After confirming that the acid value became 1.0 or lower, the reaction liquid was cooled down to room temperature to take out the content. This reaction product was a mixture containing 50% of unreacted polyethylene glycol #400, 42% of $CH_3(CH_2)_6COO(CH_2CH_2O)_9H$ and 8% of $CH_3(CH_2)_6COO(CH_2CH_2O)_9CO(CH_2)_6CH_3$.

Unreacted polyethylene glycol #400 was removed from this reaction product by washing with water to obtain $CH_3(CH_2)_6COO(CH_2CH_2O)_9H$ having a purity of 84%, which was used as a sample.

(2) Synthesis of $CH_3(CH_2)_6COO(CH_2CH_2O)_9CO(CH_2)_6CH_3$

Polyethylene glycol #400 (molecular weight: 400) of 200 g (0.5 mole), caprylic acid of 173 g (1.2 mole) and dibutyltin oxide of 0.19 g as a catalyst were weighed into a four neck flask of 500 ml, and esterification reaction was carried out at 225° C. for 5 hours while stirring under blowing nitrogen gas.

After confirming that the hydroxyl value became 1.0 or lower, the acid was removed under conditions of 200° C. and 0.27 kPa in order to distill off excess caprylic acid to obtain a sample.

(3) Synthesis of $CH_3(CH_2)_6COO(CH_2CH_2O)_{23}CO(CH_2)_6CH_3$

Polyethylene glycol #1000 (molecular weight: 1000) of 300 g (0.3 mole), caprylic acid of 104 g (0.72 mole) and dibutyltin oxide of 0.20 g as a catalyst were used to carry out the synthesis under the same conditions as in (2) described above to obtain a sample.

(4) Synthesis of $CH_3(CH_2)_{16}COO(CH_2CH_2O)_{34}CO(CH_2)_{16}CH_3$

Polyethylene glycol #1500 (molecular weight: 1500) of 225 g (0.15 mole), methyl stearate of 115 g (0.36 mole) and dibutyltin oxide of 0.17 g as a catalyst were used to carry out transesterification reaction under the same conditions as in (2) described above. Then, excess methyl stearate was distilled off at 250° C. while introducing steam to obtain a sample.

(5) Synthesis of $CH_3(CH_2)_2COO(CH_2CH_2O)_{23}CO(CH_2)_2CH_3$

Polyethylene glycol #1000 (molecular weight: 1000) of 300 g (0.3 mole), butylic acid of 63 g (0.72 mole) and sulfuric acid of 0.18 g as a catalyst were used to carry out esterification reaction at 160° C. for 5 hours while stirring under blowing nitrogen gas.

After confirming that the hydroxyl value became 1.0 or lower, excess butyric acid was removed under conditions of 160° C. and 0.27 kPa to obtain a sample.

(6) Synthesis of $CH_3(CH_2)_{16}COO(CH_2CH_2O)_5CO(CH_2)_{16}CH_3$

Polyethylene glycol #200 (molecular weight: 200) of 80 g (0.4 mole), methyl stearate of 307 g (0.96 mole) and dibutyltin oxide of 0.19 g as a catalyst were used to carry out the synthesis under the same conditions as in (4) described above to obtain a sample.

(7) Synthesis of $CH_3O(CH_2CH_2O)_9CO(CH_2)_6CH_3$

A methanol-ethylene oxide 9 mole adduct 428 g (1.0 mole), caprylic acid of 144 g (1.0 mole) and dibutyltin oxide of 0.57 g as a catalyst were weighed into a four neck flask of 1000 ml, and esterification reaction was carried out at 225° C. while stirring under blowing nitrogen gas to obtain a sample.

(8) Synthesis of $CH_3(CH_2)_{16}CH_2O(CH_2CH_2O)_{45}CO(CH_2)_{16}CH_3$

A stearyl alcohol-ethylene oxide 45 mole adduct of 562.5 g (0.25 mole), stearic acid of 71 g (0.25 mole) and dibutyltin oxide of 0.6 g as a catalyst were weighed into a four neck flask of 1000 ml, and esterification reaction was carried out at 225° C. while stirring under blowing nitrogen gas to obtain a sample.

(9) Synthesis of $CH_3(CH_2)_7CH=CH(CH_2)_8O(CH_2CH_2O)_{45}CO(CH_2)_7—CH=CH(CH_2)_7CH_3$ An oleyl alcohol-ethylene oxide 45 mole adduct of 674.4 g (0.3 mole), oleic acid of 84.6 g (0.3 mole) and dibutyltin oxide of 0.76 g as a catalyst were weighed into a four neck flask of 1000 ml, and esterification reaction was carried out at 225° C. while stirring under blowing nitrogen gas to obtain a sample.

(10) Synthesis of $CH_3(CH_2)_7O(CH_2CH_2O)_9(CH_2)_7CH_3$

Polyethylene glycol #400 (molecular weight: 400) of 400 g (1.0 mole), KOH of 112.2 g (2.0 mole) and tetrabutylammonium bromide of 0.51 g as a catalyst were weighed into a four neck flask of 1000 ml, and octyl chloride of 297 g (2.0 mole) was dropwise added thereto while stirring under blowing nitrogen gas. After further continuing stirring for 5 hours, the reaction liquid was cooled down to 70° C., and KCl was removed by filtering to obtain a sample.

The preceding anti-static agents (1) to (10) thus obtained were blended in the component shown in the following Table 5 and Table 6 by means of a banbury mixer to prepare rubber compositions.

These rubber compositions were vulcanized at 150° C. for 30 minutes to obtain rubber sheets having a thickness of about 2 mm.

The rubber sheets thus obtained were evaluated for a bloom on a rubber surface, a heat-generating property, a volume resistance and the durability [change (ΔVRc) in the volume resistance] of an anti-static performance.

Figure 2:
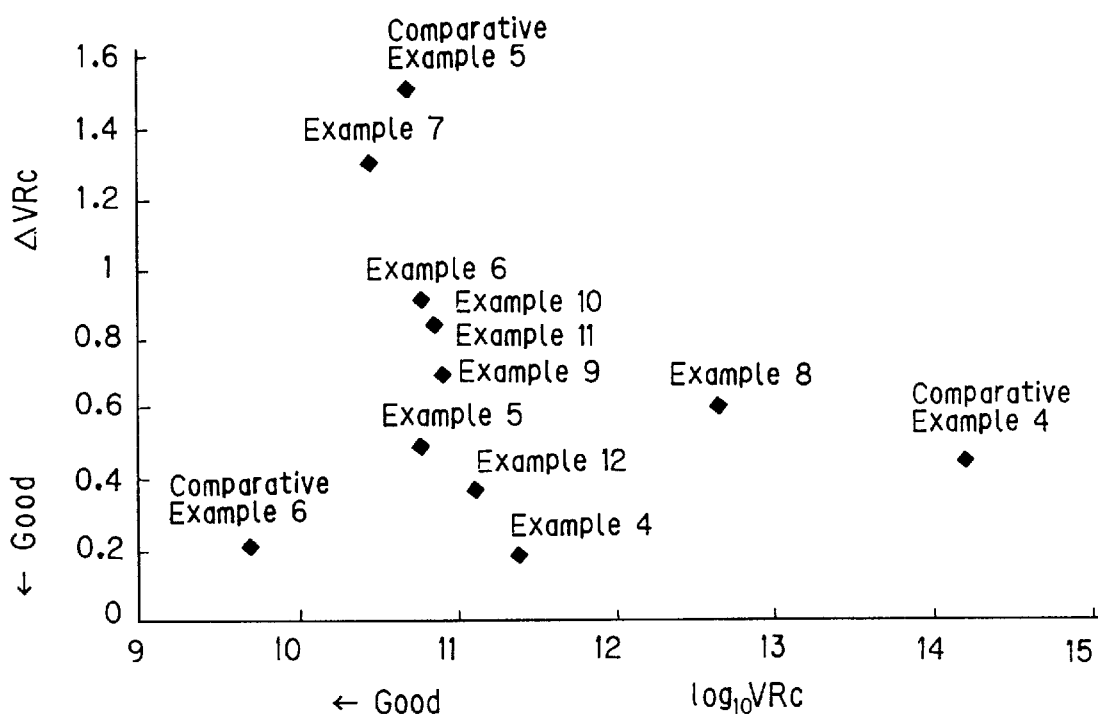
FIG. 2 is a characteristic drawing showing the relation of a volume resistance (common logarithmic value) with the durability [change (ΔVRc) in the volume resistance] of an anti-static performance in Examples 4 to 12 and Comparative Examples 4 to 6.

These results are shown in the following Table 6. The relation of the volume resistance (common logarithmic value) with the durability [change (ΔVRc) in the volume resistance] of the anti-static performance in Examples 4 to 12 and Comparative Examples 4 to 6 is shown in FIG. 2.

TABLE 4

| Number | Chemical formula of polyoxyalkylene glycol compound |
|---|---|
| (1) | $CH_3(CH_2)_6COO(CH_2CH_2O)_9H$ |
| (2) | $CH_3(CH_2)_6COO(CH_2CH_2O)_9CO(CH_2)_6CH_3$ |
| (3) | $CH_3(CH_2)_6COO(CH_2CH_2O)_{23}CO(CH_2)_6CH_3$ |
| (4) | $CH_3(CH_2)_{16}COO(CH_2CH_2O)_{34}CO(CH_2)_{16}CH_3$ |
| (5) | $CH_3(CH_2)_2COO(CH_2CH_2O)_{23}CO(CH_2)_2CH_3$ |
| (6) | $CH_3(CH_2)_{16}COO(CH_2CH_2O)_5CO(CH_2)_{16}CH_3$ |
| (7) | $CH_3O(CH_2CH_2O)_9CO(CH_2)_6CH_3$ |
| (8) | $CH_3(CH_2)_{16}CH_2O(CH_2CH_2O)_{45}CO(CH_2)_{16}CH_3$ |
| (9) | $CH_3(CH_2)_7CH=CH(CH_2)_8O(CH_2CH_2O)_{45}CO(CH_2)_7CH=CH(CH_2)_7CH_3$ |
| (10) | $CH_3(CH_2)_7O(CH_2CH_2O)_9(CH_2)_7CH_3$ |

TABLE 5

| Component | Name of product used for component | Parts by weight |
|---|---|---|
| SBR | SBR 1502 manufactured by Japan Synthetic Rubber Co., Ltd. | 100.0 |
| Filler | Nipsil AQ manufactured by Nippon Silica Co., Ltd. or Asahi #70*[1] manufactured by Asahi Carbon Co., Ltd. | 50.0 |
| Coupling agent | Si69*[2] manufactured by Degussa Japan Co., Ltd.; no addition when the filler is carbon black | 5.0 |
| Anti-static agent | Described in Table 4 | 5.0 |
| Stearic acid | Lunac S-40 manufactured by Kao Corp. | 2.0 |
| Zinc oxide | Zinc oxide No. 1 manufactured by Mitsui Kinzoku Kogyo Co., Ltd. | 3.0 |
| Anti-oxidant IPPD | Nocrac 810 NA manufactured by Ohuchi Shinko Chemical Ind. Co. Ltd | 1.0 |
| Vulcanization accelerating agent TBBS | Nocceller NS-P manufactured by Ohuchi Shinko Chemical Ind. Co. Ltd. | 0.5 |
| Vulcanization accelerating agent MBTS | Nocceller DM-P manufactured by Ohuchi Shinko Chemical Ind. Co. Ltd. | 0.5 |
| Sulfur | Powder sulfur manufactured by Karuizawa Seirensho Co., Ltd. | 1.5 |

*[1]: HAF carbon back
*[2]: Bis(3-triethoxysilylpropyl)tetrasulfide

TABLE 6

| | | Comparative Example | | | Example | | |
|---|---|---|---|---|---|---|---|
| | | 4 | 5 | 6 | 4 | 5 | 6 |
| Component | Filler | Silica | Silica | Carbon black | Silica | Silica | Silica |
| | Coupling agent | Present | Present | None | Present | Present | Present |
| | Anti-static agent | None | (1) | None | (2) | (3) | (4) |
| | Molecular weight of Anti-static agent | — | 540 | — | 666 | 1282 | 2046 |
| | Amount of etheric oxygen in Anti-static agent | — | 23.7 | — | 19.2 | 27.5 | 25.8 |
| Evaluation | Bloom on rubber surface | ◯ | Δ | ◯ | ◯ | ◯ | ◯ |
| | Heat-generating index (the smaller the better) | 100 | 97 | 168 | 106 | 110 | 107 |
| | Volume resistance (VRc) (the smaller the better) | 1.6E+14 | 5.1E+10 | 4.9E+09 | 2.4E+11 | 5.8E+10 | 7.0E+10 |
| | ΔVRc (the smaller the better) | 0.45 | 1.5 | 0.21 | 0.18 | 0.49 | 0.85 |

| | | Example | | | | | |
|---|---|---|---|---|---|---|---|
| | | 7 | 8 | 9 | 10 | 11 | 12 |
| Component | Filler | Silica | Silica | Silica | Silica | Silica | Silica |
| | Coupling agent | Present | Present | Present | Present | Present | Present |
| | Anti-static agent | (5) | (6) | (7) | (8) | (9) | (10) |
| | Molecular weight of Anti-static agent | 1170 | 770 | 554 | 2514 | 2512 | 638 |
| | Amount of etheric oxygen in Anti-static agent | 30.1 | 8.3 | 26.0 | 28.6 | 28.7 | 25.1 |
| Evaluation | Bloom on rubber surface | x | ◯ | ◯ | ◯ | ◯ | ◯ |
| | Heat-generating index (the smaller the better) | 112 | 108 | 103 | 101 | 102 | 108 |
| | Volume resistance (VRc) (the smaller the better) | 3.0E+10 | 4.7E+12 | 8.2E+10 | 6.2E+10 | 7.4E+10 | 1.3E+11 |
| | ΔVRc (the smaller the better) | 1.3 | 0.61 | 0.69 | 0.91 | 0.84 | 0.37 |

Comments on Tables 4 to 6 and FIG. 2:

As apparent from Table 6 and FIG. 2, it has been confirmed that in Examples 4 to 12 falling in the scope of the present invention, both the heat-generating properties and the volume resistances are simultaneously satisfied as compared with those in Comparative Examples 4 to 6 falling outside the scope of the present invention, so that the anti-static performances are excellent and the durability of the anti-static performance is improved as well.

Observing the individual cases, it has been confirmed that in the case of Comparative Example 4 in which the polyoxyalkylene glycol compound is not contained as an anti-static agent, the volume resistance is large and static charge is liable to be generated.

It has been found that in the case of Comparative Example 5 in which a compound obtained by adding one molecule of alcohol to one molecule of polyoxyalkylene glycol and having an alcoholic hydroxyl group at a terminal is used as an anti-static agent, the initial effect of reducing the volume resistance is large but the ΔVRc is large and the durability of the anti-static performance is poor.

It has been confirmed that in the case of Comparative Example 6 in which carbon black is used as a filler, the volume resistance is low and the durability of the anti-static performance is excellent without adding the anti-static agent but the heat-generating property is inferior to a large extent.

In the case of Examples 4 to 12 with an exception of Example 7 in which the polyoxyalkylene glycol compounds of the present invention are contained as antistatic agents, the low heat-generating properties, the anti-static performances and the durabilities thereof and the bloom resistances all are simultaneously satisfied.

In Example 7 which falls in the scope of the present invention, the anti-static performance and low heat-generating property are balanced, while the bloom resistance is inferior to other Examples.

Otherwise, all other Examples fulfill the intended purpose. In particular, in the case of Examples 4 to 6 and Examples 9 to 12 in which more preferable polyoxyalkylene glycol compounds are contained as antistatic agents, the low heat-generating properties, the anti-static performances and the durabilities thereof and the bloom resistances all are highly satisfied simultaneously.

Next, the following test was further carried out in order to confirm the effect of improving the durability by excluding an alcoholic hydroxyl group from the polyoxyethylene glycol compound in the present invention.

That is, the vulcanized rubber sheets prepared in Comparative Example 5 and Example 5 were put in a gear oven at 80° C. for 2 weeks to age them, and after aging, the vulcanized rubber sheets were cut into fine pieces to precisely weight about 1 g of them.

Ethanol 50 ml was added to it to carry out extraction at room temperature for 72 hours. The anti-static agent extracted in the extract was determined by means of $^1$H-NMR to calculate the recovery rate, wherein the amount calculated from the blending amount was set to 100. The results thereof are shown in the following Table 7.

TABLE 7

|  | Comparative Example 5 | Example 5 |
| --- | --- | --- |
| Recovery rate after aging | 25.9 | 47.8 |

Comments on Table 7:

Since the anti-static agent used in Comparative Example 5 has approximately the same etheric oxygen content as that of the anti-static agent used in Example 5, it is considered that there is no big difference between them in terms of an SP value (solubility parameter), but as apparent from the results shown in Table 7, it can be found that the recovery rate is higher in Example 5.

Accordingly, it is considered that the effective anti-static component has been increased even after aging by removing the alcoholic hydroxyl group, and therefore the durability has been improved.

What is claimed is:

1. An anti-static property composition comprising natural rubber and/or diene base synthetic rubber and a white filler as a filler, and further comprising an anionic anti-static agent or a polyoxyalkylene glycol compound represented by the following formula (I), (II) or (III):

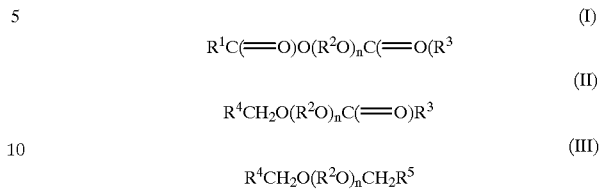

wherein $R^1$ and $R^3$ in the above formulas (I) to (III) each represent a linear or branched, saturated or unsaturated aliphatic hydrocarbon group having 1 to 21 carbon atoms, or an aryl group; $R^4$ and $R^5$ each represent a hydrogen atom, a linear or branched, saturated or unsaturated aliphatic hydrocarbon group having 1 to 21 carbon atoms, or an aryl group; $R^1$ and $R^3$ in the above formula (I), $R^4$ and $R^3$ in the above formula (II) and $R^4$ and $R^5$ in the above formula (III) in one same molecule may be the same as or different from each other; $R^2$ is a methylene, ethylene, propylene or tetramethylene group, and all $R^2$'s may be the same or different; and n is an integer of 100 or less.

2. The anti-static rubber composition as described in claim 1, wherein the polyoxyalkylene glycol compound represented by the above formula (I), (II) or (III) has a molecular weight of 300 to 2600.

3. The anti-static rubber composition as described in claim 1, wherein the polyoxyalkylene glycol compound represented by the above formula (I), (II) or (III) has an amount of etheric oxygen of 12 to 30% by weight in one molecule.

4. The anti-static rubber composition as described in claim 2, wherein the polyoxyalkylene glycol compound represented by the above formula (I), (II) or (III) has an amount of etheric oxygen of 12 to 30% by weight in one molecule.

5. The anti-static rubber composition as described in claim 1, wherein $R^2$ in the polyoxyalkylene glycol compound represented by the above formula (I), (II) or (III) is an ethylene group and in the case of the formula (I), $R^1$ is an alkyl group having 1 to 17 carbon atoms, and $R^3$ is an alkyl group having 7 to 17 carbon atoms; in the case of the formula (II), $R^4$ is a hydrogen atom or an alkyl group having 1 to 17 carbon atoms, and $R^3$ is an alkyl group having 7 to 17 carbon atoms; and in the case of the formula (III), $R^4$ is a hydrogen atom or an alkyl group having 1 to 17 carbon atoms, and $R^5$ is a hydrogen atom or an alkyl group having 7 to 17 carbon atoms.

6. The anti-static rubber composition as described in claim 2, wherein $R^2$ in the polyoxyalkylene glycol compound represented by the above formula (I), (II) or (III) is an ethylene group and in the case of the formula (I), $R^1$ is an alkyl group having 1 to 17 carbon atoms, and $R^3$ is an alkyl group having 7 to 17 carbon atoms; in the case of the formula (II), $R^4$ is a hydrogen atom or an alkyl group having 1 to 17 carbon atoms, and $R^3$ is an alkyl group having 7 to 17 carbon atoms; and in the case of the formula (III), $R^4$ is a hydrogen atom or an alkyl group having 1 to 17 carbon atoms, and $R^5$ is a hydrogen atom or an alkyl group having 7 to 17 carbon atoms.

7. The anti-static rubber composition as described in claim 3, wherein $R^2$ in the polyoxyalkylene glycol compound represented by the above formula (I), (II) or (III) is an ethylene group and in the case of the formula (I), $R^1$ is an alkyl group having 1 to 17 carbon atoms, and $R^3$ is an alkyl group having 7 to 17 carbon atoms; in the case of the formula (II), $R^4$ is a hydrogen atom or an alkyl group having 1 to 17 carbon atoms, and $R^3$ is an alkyl group having 7 to 17 carbon atoms; and in the case of the formula (III), $R^4$ is a hydrogen atom or an alkyl group having 1 to 17 carbon atoms, and $R^5$ is a hydrogen atom or an alkyl group having 7 to 17 carbon atoms.

8. The anti-static rubber composition as described in claim 4, wherein $R^2$ in the polyoxyalkylene glycol compound represented by the above formula (I), (II) or (III) is an ethylene group and in the case of the formula (I), $R^1$ is an alkyl group having 1 to 17 carbon atoms, and $R^3$ is an alkyl group having 7 to 17 carbon atoms; in the case of the formula (II), $R^4$ is a hydrogen atom or an alkyl group having 1 to 17 carbon atoms, and $R^3$ is an alkyl group having 7 to 17 carbon atoms; and in the case of the formula (III), $R^4$ is a hydrogen atom or an alkyl group having 1 to 17 carbon atoms, and $R^5$ is a hydrogen atom or an alkyl group having 7 to 17 carbon atoms.

9. The anti-static rubber composition as claimed in claim 1, wherein said anti-static rubber composition consists essentially of natural rubber and/or diene base synthetic rubber as the rubber component.

* * * * *

UNITED STATES PATENT AND TRADEMARK OFFICE
CERTIFICATE OF CORRECTION

PATENT NO. : 6,130,277
DATED : October 10, 2000
INVENTOR(S) : Nobuyuki Okamura, Masaaki Tsuchihashi and Isao Nishi It is certified that error appears in the above-identified patent and that said Letters Patent is hereby corrected as shown below:

<u>Column 15,</u>
Line 66, Claim 1 should read:

1. An anti-static rubber composition comprising natural rubber and/or diene base synthetic rubber and a white filler as a filler, and further comprising a polyoxyalkylene glycol compound represented by the following formula (I), (II) or (III):

$$R^1C(=O)O(R^2O)_nC(=O)R^3 \qquad (I)$$
$$R^4CH_2O(R^2O)_nC(=O)R^3 \qquad (II)$$
$$R^4CH_2O(R^2O)_nCH_2R^5 \qquad (III)$$

wherein $R^1$ and $R^3$ in the above formulas (I) to (III) each represent a linear or branched, saturated or unsaturated aliphatic hydrocarbon group having 1 to 21 carbon atoms, or an aryl group; $R^4$ and $R^5$ each represent a hydrogen atom, a linear or branched, saturated or unsaturated aliphatic hydrocarbon group having 1 to 21 carbon atoms, or an aryl group; $R^1$ and $R^3$ in the above formula (I), $R^4$ and $R^3$ in the above formula (II) and $R^4$ and $R^5$ in the above formula (III) in one same molecule may be the same as or different from each other; $R^2$ is a methylene, ethylene, propylene or tetramethylene group, and all $R^2$'s may be the same or different; and n is an integer [of 100 or less] <u>from 1 to 100</u>.

Signed and Sealed this

Third Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.    : 6,130,277
DATED         : October 10, 2000
INVENTOR(S)   : Nobuyuki Okamura, Masaaki Tsuchihashi and Isao Nishi It is certified that error appears in the above-identified patent and that said Letters Patent is hereby corrected as shown below:

<u>Title page,</u>
Item [73], Assignee, should read:
-- [73] Assignee: Bridgestone Corporation and Kao Corporation, both of Tokyo, Japan --

Signed and Sealed this

Fourteenth Day of January, 2003

JAMES E. ROGAN
*Director of the United States Patent and Trademark Office*